United States Patent
Kim et al.

(10) Patent No.: US 11,392,086 B2
(45) Date of Patent: Jul. 19, 2022

(54) HOLOGRAM DISPLAY DEVICE AND METHOD FOR MANUFACTURING THE SAME

(71) Applicant: ELECTRONICS AND TELECOMMUNICATIONS RESEARCH INSTITUTE, Daejeon (KR)

(72) Inventors: Yong Hae Kim, Daejeon (KR); Seong-Mok Cho, Daejeon (KR); Chi-Sun Hwang, Daejeon (KR); Ji Hun Choi, Daejeon (KR); Gi Heon Kim, Daejeon (KR); Jong-Heon Yang, Daejeon (KR); Sang Hoon Cheon, Daejeon (KR); Kyunghee Choi, Daejeon (KR); Jae-Eun Pi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 6 days.

(21) Appl. No.: 16/988,072

(22) Filed: Aug. 7, 2020

(65) Prior Publication Data

US 2021/0124305 A1 Apr. 29, 2021

(30) Foreign Application Priority Data

Oct. 23, 2019 (KR) .................. 10-2019-0132336

(51) Int. Cl.
*G03H 1/22* (2006.01)

(52) U.S. Cl.
CPC ......... *G03H 1/2205* (2013.01); *G03H 1/2294* (2013.01); *G03H 2001/2239* (2013.01)

(58) Field of Classification Search
CPC .............. G03H 1/2205; G03H 1/2294; G03H 2001/2239; G03H 2225/22;
(Continued)

(56) References Cited

U.S. PATENT DOCUMENTS 8,218,211 B2 * 7/2012 Kroll .................... G03H 1/2205
359/9
8,624,961 B2 1/2014 Li
(Continued)

FOREIGN PATENT DOCUMENTS

| KR | 1020170083865 A | 7/2017 |
| KR | 1020180118942 A | 11/2018 |
| KR | 1020180138111 A | 12/2018 |

OTHER PUBLICATIONS

"Expanded," Google search, Jan. 25, 2022 (Year: 2022).*
(Continued)

*Primary Examiner* — Jade R Chwasz
(74) *Attorney, Agent, or Firm* — Rabin & Berdo, P.C.

(57) ABSTRACT

A hologram display device includes a light source unit that emits light, a spatial light modulator that modulates the light emitted from the light source unit, and a random pinhole panel. The random pinhole panel includes a plurality of pinholes of a random position or a random size and is arranged in line with an output part of the spatial light modulator. In the hologram display device and the method of manufacturing the hologram display device, a position and size of a random pinhole on the random pinhole are not limited to inside each pixel of the spatial light modulator.

11 Claims, 18 Drawing Sheets

(58) Field of Classification Search
CPC .. G03H 2225/55; G03H 2223/12; G03H 1/22; G03H 1/12; G03H 2001/0224; G02B 5/32; G02B 26/0808; G02B 26/06; G02F 1/1347
USPC .......................................................... 359/32
See application file for complete search history.

(56) References Cited

U.S. PATENT DOCUMENTS

| | | |
|---|---|---|
| 9,904,251 B2 | 2/2018 | Byun et al. |
| 2010/0328433 A1* | 12/2010 | Li .................... H04N 13/189 348/51 |
| 2012/0019883 A1 | 1/2012 | Chae et al. |
| 2018/0364641 A1 | 12/2018 | Park et al. |
| 2020/0142355 A1* | 5/2020 | An ......................... G03H 1/02 |

OTHER PUBLICATIONS

Jongchan Park et al., "Ultrathin wide-angle large-area digital 3D holographic display using a non-periodic photon sieve", Nature communication, (2019)10:1304, pub Mar. 21, 2019.

* cited by examiner 510  520  530

610  620

HOLOGRAM DISPLAY DEVICE AND METHOD FOR MANUFACTURING THE SAME

CROSS-REFERENCE TO RELATED APPLICATIONS

This U.S. non-provisional patent application claims priority under 35 U.S.C. § 119 of Korean Patent Application No. 10-2019-0132336, filed on Oct. 23, 2019, the entire contents of which are hereby incorporated by reference.

BACKGROUND

Embodiments of the inventive concept relate to a holography technology, and more particularly, relate to a device for displaying a high-efficiency hologram with a wide viewing angle in which a size of a pinhole and a position of the pinhole are random, and a manufacturing method thereof.

Unlike a conventional method that makes you feel a three-dimensional effect by using an optical illusion of your eyes, an image using a holography method allows you to see an actual image directly. Accordingly, the image using the holography method provides the three-dimensional effect that is no different from seeing a real image. In a holography technology, an eye fatigue that is caused by viewing the image using a binocular parallax may be fundamentally avoided. Therefore, the holography technology draws a lot of attention as the next generation stereoscopic image technology that should ultimately be reached.

In contrast to displaying the image by recording only intensity of the light in a two-dimensional photograph, the holography technology reproduces a three-dimensional image by recording the intensity and a phase of the light. An acousto-optic modulator (AOM) and a spatial light modulator (SLM) such as a liquid crystal display (LCD) are mainly used to display a hologram image.

The holography technique records interference fringes of a reference wave and an object wave reflected from an object on a photosensitive film in a hologram form, using a coherent light source. When the reference wave is irradiated on the photosensitive film of the hologram, an image of the object is formed in its original position depending on a diffraction principle of light. In this case, to view a high-resolution image in a wide field of view, it is required that the photosensitive film has high resolution. However, an electronic device manufacturing technology capable of electronically obtaining and displaying holograms still has technical limitations in obtaining high-resolution images.

SUMMARY

Embodiments according to the inventive concept provide a device for displaying a high-efficiency hologram with a wide viewing angle and a manufacturing method thereof.

According to an embodiment of the inventive concept, a hologram display device includes a light source unit that emits light, a spatial light modulator that modulates the light emitted from the light source unit, and a random pinhole panel that transmits the modulated light, and wherein the random pinhole panel includes a first pixel including a first pinhole and a second pixel adjacent to the first pixel in a first direction and including a second pinhole, and wherein the first pinhole is expanded to at least a portion of the second pixel.

According to an embodiment, when the expanded first pinhole contacts the second pinhole of the second pixel, the expanded first pinhole may not be expanded.

According to an embodiment, when the expanded first pinhole contacts the second pinhole of the second pixel, a position of the second pinhole in the second pixel may be changed According to an embodiment, the second pinhole may be expanded in a direction opposite to the first direction.

According to an embodiment, when the expanded first pinhole contacts the expanded second pinhole, the expanded first pinhole and the expanded second pinhole may not be expanded.

According to an embodiment, the random pinhole panel may include a third pixel, wherein the third pixel may be adjacent to the first pixel in a second direction different from the first direction, and wherein the third pixel may include a third pinhole.

According to an embodiment, the first pinhole may be expanded to the second direction.

According to an embodiment, when the expanded first pinhole contacts the third pinhole, the expanded first pinhole may not be expanded.

According to an embodiment of the inventive concept, a method of manufacturing a hologram display device including a light source unit that emits light, a spatial light modulator that modulates the light emitted from the light source unit, and a random pinhole panel, the method includes providing driving transistors to a plurality of pixels of the spatial light modulator, respectively, forming contact holes connecting the driving transistors and the random pinhole panel at positions of random pinholes in the random pinhole panel, connecting the contact holes to the driving transistors, and connecting the random pin holes to the contact holes, and wherein at least one of the random pinholes overlaps at least two of the plurality of pixels.

According to an embodiment, the method may further include providing layers connecting the random pinholes to the driving transistors.

According to an embodiment, the method may further include depositing a light modulating material on a bottom electrode.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Figure 1:
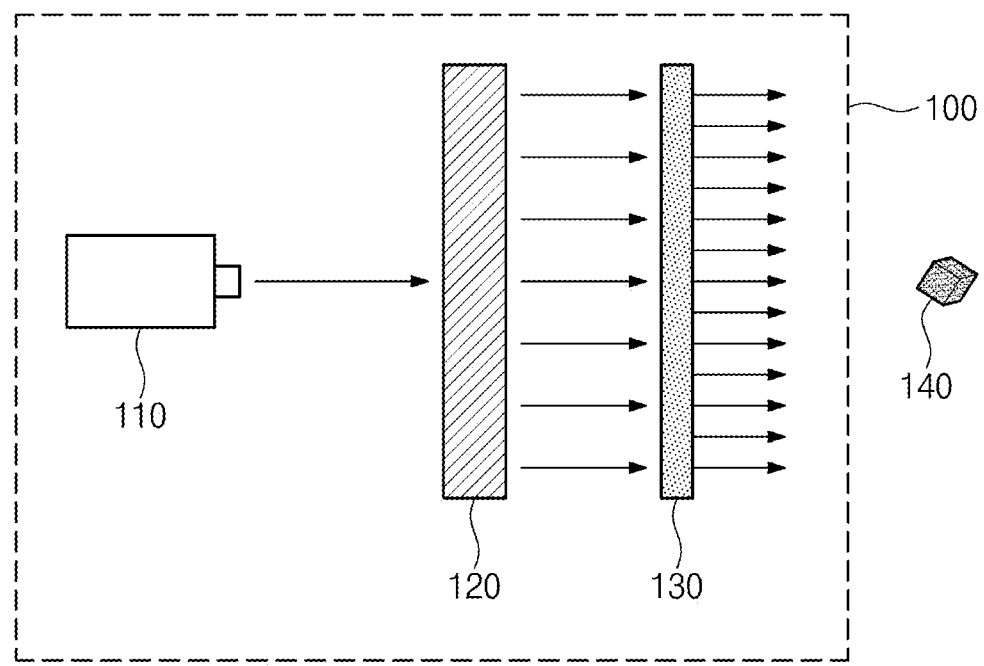
FIG. 1 is a schematic diagram of a hologram display device according to an embodiment of the inventive concept.

Hereinafter, embodiments of the inventive concept will be described clearly and in detail such that those skilled in the art may easily carry out the inventive concept.

The terminology used herein is for the purpose of describing particular embodiments only and is not intended to be limiting of the invention. As used herein, the singular forms include plural forms unless the context clearly dictates otherwise. The word "comprise" and/or "comprising" when used in this specification does not exclude the presence or addition of one or more other components, steps, operations and/or elements thereof.

Unless defined otherwise, all terms including technical and scientific terms used herein have the same meaning as can be understood by one of ordinary skill in the art to which the inventive concept belongs. Generally, terms defined in the dictionary are interpreted to have equivalent meaning to the contextual meanings in the related art and are not to be construed as having ideal or overly formal meaning unless expressly defined in the text. In this specification, the same reference numerals throughout the entirety may refer to the same components.

FIG. 1 is a schematic diagram of a hologram display device according to an embodiment of the inventive concept.

Referring to FIG. 1, a hologram display device 100 according to the inventive concept may include a light source unit 110, a spatial light modulator 120, and a random pinhole panel 130.

According to an embodiment of the inventive concept, the light source unit 110 may emit light. The light source unit 110 may be a laser light source that generates laser light having coherent characteristics, or may be a light emitting diode (LED) light source. The light emitted from the light source unit 110 may be incident on the spatial light modulator 120.

The spatial light modulator 120 may display a hologram image 140 by modulating the incident light. The light modulated by the spatial light modulator 120 may be incident on the random pinhole panel 130.

The light incident on the random pinhole panel 130 may be emitted from the random pinhole panel 130 to implement the hologram image 140. The random pinhole panel 130 may be arranged or attached in line to an output part of the spatial light modulator 120.

According to an embodiment of the inventive concept, a position or size of a pinhole on the random pinhole panel 130 may not be limited by a pixel pitch of the spatial light modulator 120. When a random pinhole is expanded outside the pixel pitch of the spatial light modulator 120, a brightness of the hologram image may be increased without reducing a viewing angle. According to an embodiment of the inventive concept, since the brightness of the hologram image increases without loss of viewing angle, it is easy to observe the hologram image, and even when light intensity of the light source unit 110 is lowered, an image with bright brightness may be realized, thereby creating an energy saving effect.

Figure 2A:
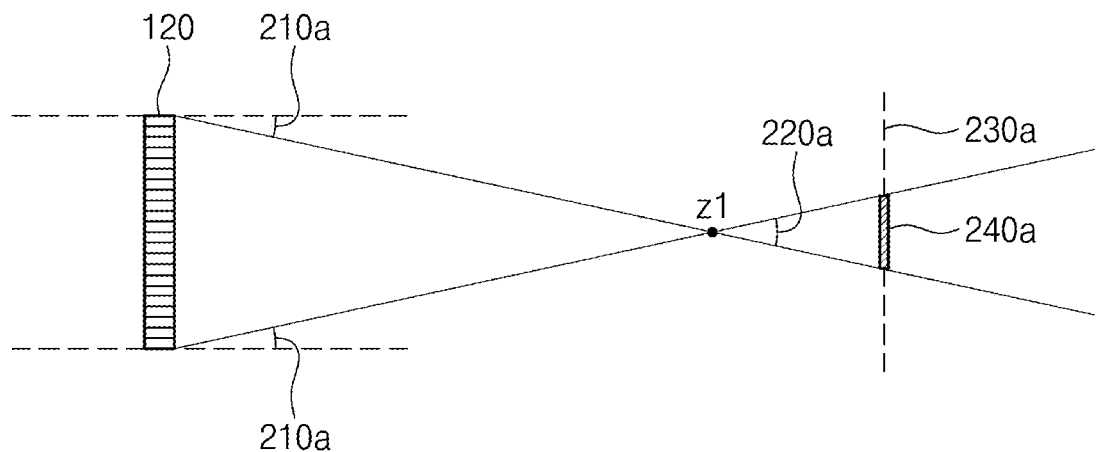
FIG. 2A is a diagram describing how to measure a viewing angle of a hologram display device including a spatial light modulator.

FIG. 2A is a diagram describing how to measure a viewing angle of a hologram display device including a spatial light modulator.

Referring to FIG. 2A, the light emitted from the spatial light modulator 120 may be diffracted. In FIG. 2A, a degree of diffraction of the light that passes through the spatial light modulator 120 may be defined as a diffraction angle 210a. The diffraction angle 210a of the light that passes through the spatial light modulator 120 means an angle formed by a horizontal line expanding from the upper or lower portion of the spatial light modulator 120 and the diffracted light. The diffraction angle 210a may have a size of $\varphi_1$.

The diffracted light may go straight and intersect at a focal point z1. An angle formed by the light intersected at the focal point z1 may be defined as a viewing angle 220a. The viewing angle 220a may have a size of $2\varphi_1$. The light intersected by the viewing angle 220a of 2 φ₁ may reach an observation plane 230a to implement the hologram image 140 (refer to FIG. 1). On the observation plane 230a, an area within a range of the viewing angle 220a may be defined as a viewing zone 240a. In the viewing zone 240a, an original image to be reproduced as a hologram may be reproduced. Outside the viewing zone 240a, the original image to be reproduced as the hologram may appear as a higher-order image.

Figure 2B:
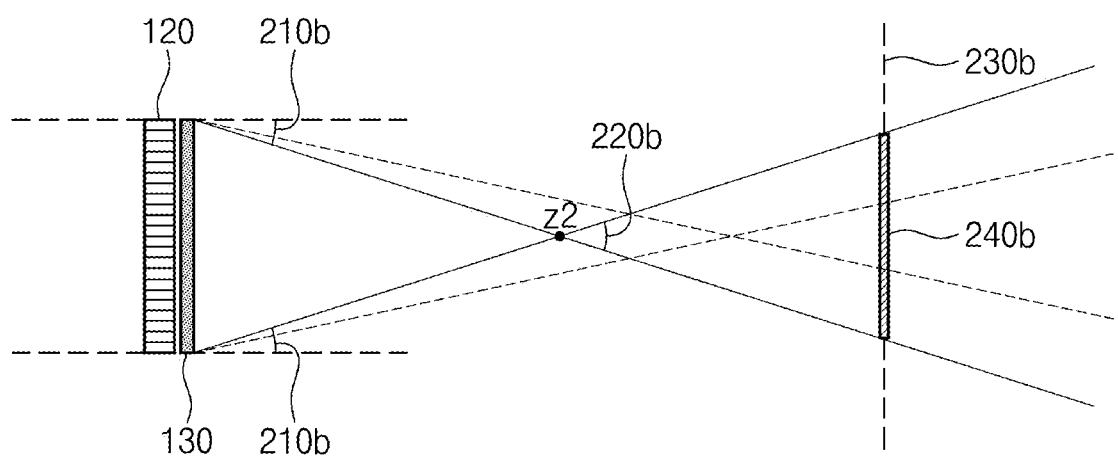
FIG. 2B is a diagram describing how to measure a viewing angle of a hologram display device including a spatial light modulator and a random pinhole panel.

FIG. 2B is a diagram describing how to measure a viewing angle of a hologram display device including a spatial light modulator and a random pinhole panel.

Referring to FIG. 2B, the light emitted from the spatial light modulator 120 may pass through the random pinhole panel 130. The light passing through the random pinhole panel 130 may be diffracted. In FIG. 2B, a degree of diffraction of the light that passes through the random pinhole panel 130 may be defined as a diffraction angle 210b. The diffraction angle 210b of the light that passes through the random pinhole panel 130 means an angle formed by a horizontal line expanding from an upper part or a lower part of the random pinhole panel 130 and the diffracted light. The diffraction angle 210b may have a size of φ₂.

The diffracted light may go straight and intersect at a focal point z2. An angle formed by the light intersected at the focal point z2 may be defined as a viewing angle 220b. The viewing angle 220b may have a size of 2 φ₂.

On an observation plane 230b, an area within a range of the viewing angle 220b may be defined as a viewing zone 240b. On the observation plane 230b, an original image to be reproduced as a hologram may be reproduced in the viewing zone 240b. Outside the viewing zone 240b, the original image to be reproduced as the hologram may appear as a higher-order image.

When comparing FIG. 2A with FIG. 2B, it may be understood that the diffraction angle 210b when the light passes through the spatial light modulator 120 and the random pinhole panel 130 is expanded than the diffraction angle 210a when the light passes only the spatial light modulator 120. By expanding the diffraction angle, the viewing angle at which the hologram image 140 may be viewed may also increase. In other words, when the random pinhole panel 130 is included in the hologram display device 100 (refer to FIG. 1), the viewing angle of the hologram image 140 may be expanded.

Figure 3:
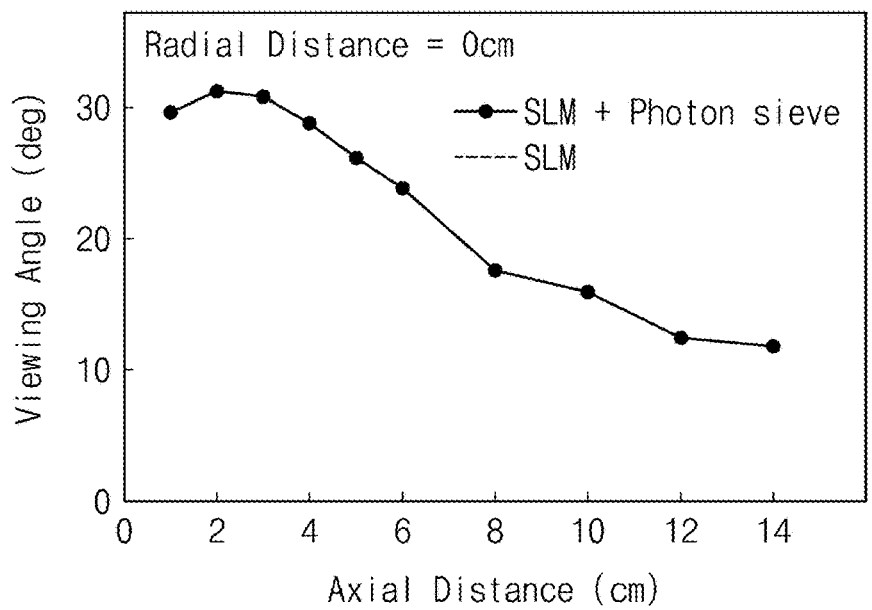
FIG. 3 is a graph illustrating a size of a viewing angle depending on an axial distance.

FIG. 3 is a graph illustrating a size of a viewing angle depending on an axial distance.

In more detail, the dotted line graph in FIG. 3 represents a change in the viewing angle depending on the axial distance of the hologram display device 100 (refer to FIG. 1) including the spatial light modulator 120 (refer to FIG. 1). The solid line graph in FIG. 3 represents a change in the viewing angle depending on the axial distance of the hologram display device 100 including the spatial light modulator 120 and the random pinhole panel 130. When the pixel pitch of the spatial light modulator 120 is p, the viewing angle 2φ is expressed by Equation 1 below.

$$2\varphi = \sin^{-1}(\lambda/p) \quad \text{[Equation 1]}$$

To expand the viewing angle of the hologram display device 100 including the spatial light modulator 120, it is necessary that the pixel pitch of the spatial light modulator 120 is reduced. However, it is difficult to reduce the pixel pitch due to process problems. Accordingly, to expand the viewing angle, the inventive concept may include the random pinhole panel 130 in addition to the spatial light modulator 120.

Referring to FIG. 3, it may be understood that the viewing angle of the hologram display device 100 including the spatial light modulator 120 and the random pinhole panel 130 is significantly expanded than the viewing angle of the hologram display device 100 including the spatial light modulator 120. In other words, the random pinhole panel 130 may serve to expand the viewing angle in the hologram display device 100. A position or a size of the pinhole in the random pinhole panel 130 may be random.

Figure 4:
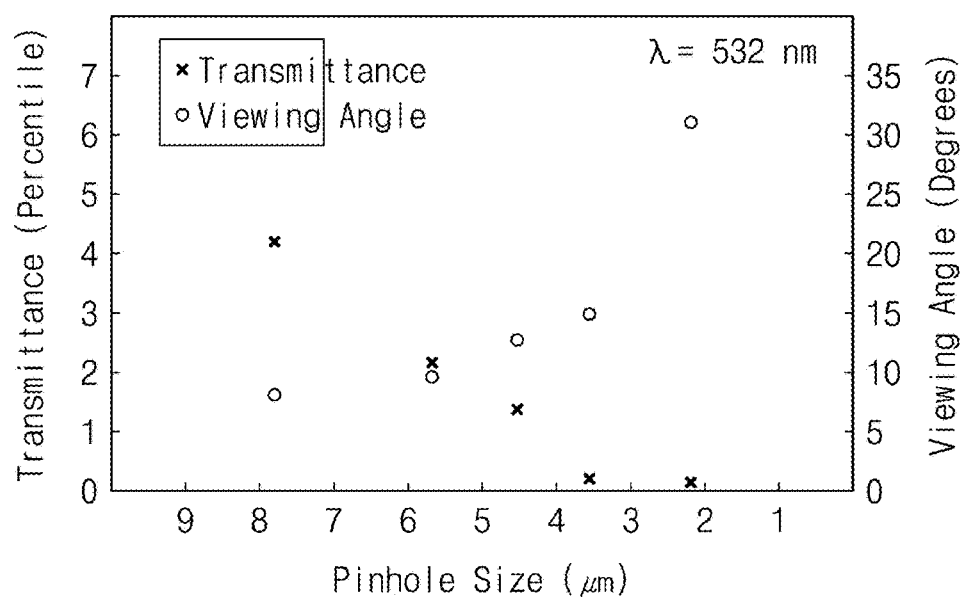
FIG. 4 is a graph illustrating a light transmittance and a size of a viewing angle, based on a size of a pinhole.

FIG. 4 is a graph illustrating a light transmittance and a size of a viewing angle, based on a size of a pinhole.

In an embodiment, it is illustrated in FIG. 4 that the viewing angle and the transmittance of the light are measured using a light having a wavelength λ of 532 nm. The light emitted from the light source unit 110 (refer to FIG. 1) may pass through the pinhole and may go straight. As the size of the pinhole becomes smaller on the random pinhole panel 130 (refer to FIG. 1), since the diffraction of the light is easy, the viewing angle may be greater. However, as the size of the pinhole is smaller, since an area through which the light may pass through the panel is reduced, the transmittance may be lowered. When the transmittance of the light is lowered, the hologram image 140 (refer to FIG. 1) to be displayed may be dark.

Figure 5:
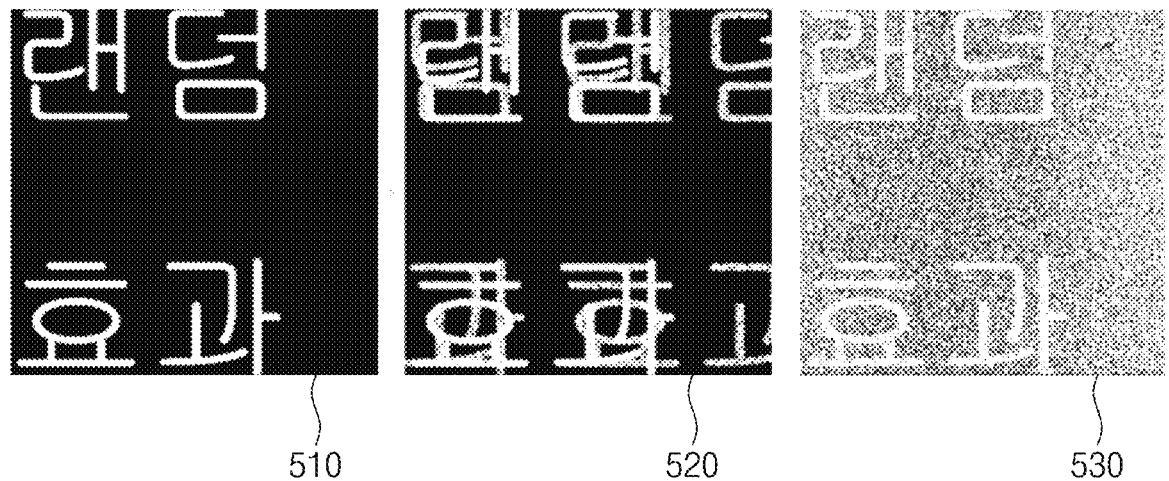
FIG. 5 is a diagram illustrating results of image simulations when a random pinhole panel is included and when a random pinhole panel is not included.

FIG. 5 is a diagram illustrating results of image simulations when a random pinhole panel is included and when a random pinhole panel is not included.

In more detail, FIG. 5 illustrates an original image 510, an image simulation 520 that is reproduced by a device including the spatial light modulator 120 (refer to FIG. 1), and an image simulation 530 that is reproduced by a device including the spatial light modulator 120 and the random pinhole panel 130 (refer to FIG. 1). In the simulation, the spatial light modulator 120 having the pixel pitch of 8 μm×2 μm and the random pinhole panel 130 having the random pinhole of 2 μm×2 μm are exemplarily applied.

Referring to FIG. 5, since the image simulation 520 reproduced by the device including the spatial light modulator 120 has a relatively small viewing angle, images by high-order terms are implemented by being mixed. On the other hand, since the image simulation 530 reproduced in the device including the spatial light modulator 120 and the random pinhole panel 130 has a relatively expanded viewing angle, images by high-order terms are not implemented. However, due to the effect of the random pinhole, noise increases and a darker hologram image is reproduced.

Figure 6:
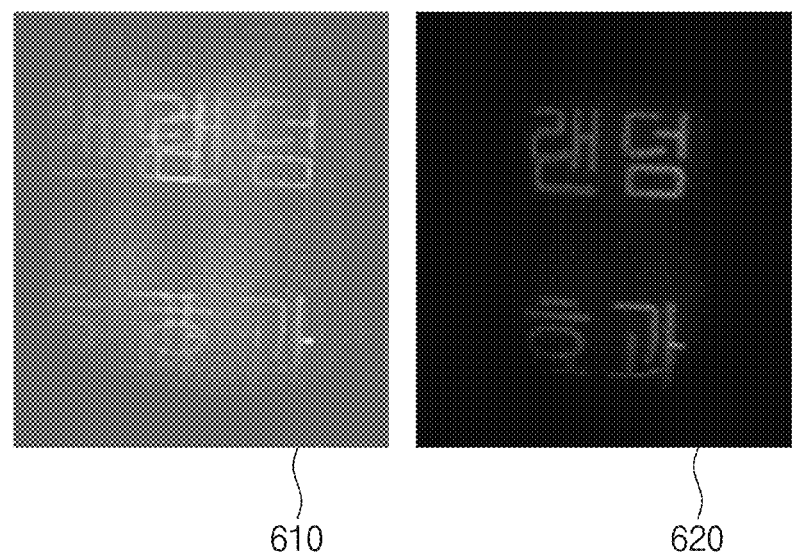
FIG. 6 is a diagram illustrating comparative experimental results when a random pinhole panel is included and when a random pinhole panel is not included.

FIG. 6 is a diagram illustrating comparative experimental results when a random pinhole panel is included and when a random pinhole panel is not included.

In more detail, FIG. 6 is an experimental result to the simulation of FIG. 5. FIG. 6 represents an experimental result 610 using a device that includes only the spatial light modulator 120 (refer to FIG. 1), and represents an experimental result 620 using a device that includes both the spatial light modulator 120 and the random pinhole panel 130 (refer to FIG. 1). In the experiment, the spatial light modulator 120 having the pixel pitch of 8 μm×2 μm and the random pinhole panel 130 having the random pinhole of 2 μm×2 μm are applied.

Referring to FIG. 6, according to the experimental result in the device including only the spatial light modulator 120, images by high-order terms are mixed. According to the experimental result in the device including both the spatial light modulator 120 and the random pinhole panel 130, images by high-order terms are not implemented. However, a hologram image having a darker brightness than the original image is implemented.

As described above, although the random pinhole panel 130 may be introduced for the expansion of the viewing angle, when the random pinhole panel 130 is included in the device, there is a problem that the brightness of the hologram image implemented is decreased. Accordingly, the inventive concept proposes a method for increasing the size of the pinhole on the random pinhole panel 130.

Figure 7:
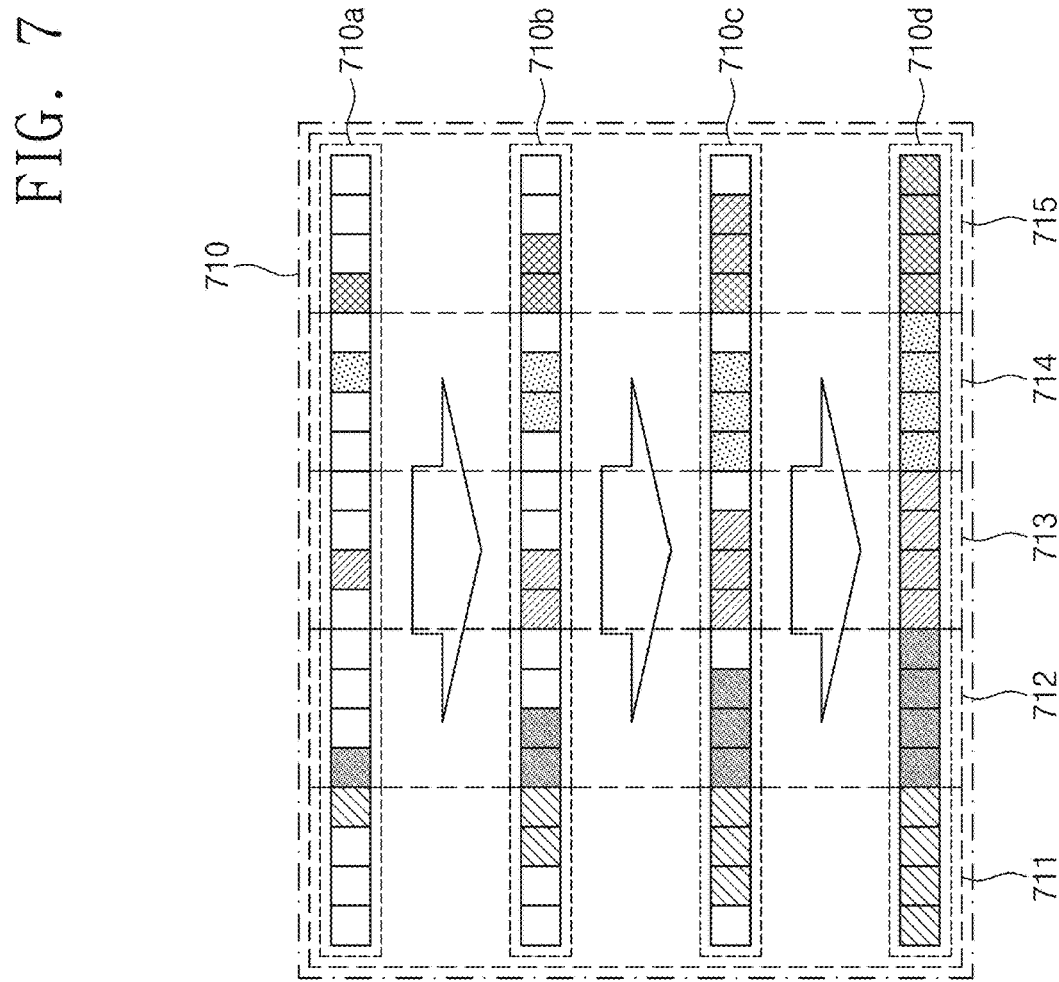
FIG. 7 is a diagram illustrating a method of applying a mirror boundary condition that is applied to a random pinhole panel and simulation results reproduced depending on application of the mirror boundary condition.

FIG. 7 is a diagram illustrating a method of applying a mirror boundary condition that is applied to a random pinhole panel and simulation results reproduced depending on application of the mirror boundary condition.

In pixels 711, 712, 713, 714, and 715 of the spatial light modulator 120 (refer to FIG. 1), a direction from the first pixel 711 to the fifth pixel 715 may be defined as a first direction.

In more detail, FIG. 7 represents a method 710 of applying the mirror boundary condition, which is one of methods for increasing the size of the pinhole on the random pinhole panel 130 (refer to FIG. 1), and represents a simulation result depending on the application of the mirror boundary condition. When the mirror boundary condition is applied, the size of the pinhole may increase in a direction opposite to the first direction. However, when the pinhole is located at edges of the pixels 711, 712, 713, 714, and 715 of the spatial light modulator 120, as the size of the pinhole may not be expanded within the pixels in the direction opposite to the first direction, the size of the pinhole may increase in the first direction. In other words, when the mirror boundary condition is applied, the pinhole may not be expanded outside the pixels 711, 712, 713, 714, and 715 of the spatial light modulator 120.

In an embodiment of FIG. 7, the pixel pitch of the spatial light modulator 120 may be 8 μm×2 μm. Before the size of the pinhole increases, the size of the pinhole on the random pinhole panel 130 in an initial stage 710a may be 2 μm×2 μm. Therefore, in the embodiment of FIG. 7, the size of the pinhole may not exceed 8 μm×2 μm.

When the mirror boundary condition is applied to the first pixel 711, the 2 μm×2 μm pinhole existing at the edge of the pixel in the initial stage 710a is expanded in the direction opposite to the first direction to become a 4 μm×2 μm pinhole in a second stage 710b. The 4 μm×2 μm pinhole in the second stage 710b may be expanded in the direction opposite to the first direction in a third stage 710c to become a 6 μm×2 μm pinhole. The 6 μm×2 μm pinhole in the third stage 710c may be expanded in the direction opposite to the first direction in a fourth stage 710d to become an 8 μm×2 μm pinhole.

When the mirror boundary condition is applied to the second pixel 712, the 2 μm×2 μm pinhole existing at the edge of the pixel in the initial stage 710a may not be expanded in the direction opposite to the first direction. Therefore, the size of the pinhole is expanded in the first direction, and the size of the pinhole in the second stage 710b may be 4 μm×2 μm. The 4 μm×2 μm pinhole in the second stage 710b may not be expanded in the direction opposite to the first direction in the third stage 710c. Therefore, the size of the pinhole may be expanded in the first direction to become a 6 μm×2 μm pinhole. The 6 μm×2 μm pinhole in the third stage 710c may not be expanded in the direction opposite to the first direction in the fourth stage 710d. Therefore, the size may be expanded in the first direction to become an 8 μm×2 μm pinhole.

When the mirror boundary condition is applied to the third pixel 713, the pinhole in the initial stage 710a may be expanded in the direction opposite to the first direction to become a 4 μm×2 μm pinhole in the second stage 710b. The 4 μm×2 μm pinhole in the second stage 710b may not be expanded in the direction opposite to the first direction in the third stage 710c. Therefore, the size of the pinhole may be expanded in the first direction to become a 6 μm×2 μm pinhole. The 6 μm×2 μm pinhole in the third stage 710c may not be expanded in the direction opposite to the first direction in the fourth stage 710d. Therefore, the size of the pinhole may be expanded in the first direction to become an 8 μm×2 μm pinhole.

When the mirror boundary condition is applied to the fourth pixel 714, the pinhole in the initial stage 710a may be expanded in the direction opposite to the first direction to become a 4 μm×2 μm pinhole in the second stage 710b. The 4 μm×2 μm pinhole in the second stage 710b may be expanded in the direction opposite to the first direction to become a 6 μm×2 μm pinhole in the third stage 710c. The 6 μm×2 μm pinhole in the third stage 710c may not be expanded in the direction opposite to the first direction in the fourth stage 710d. Therefore, the size of the pinhole may be expanded in the first direction to become an 8 μm×2 μm pinhole.

When the mirror boundary condition is applied to the fifth pixel 715, the pinhole may be expanded in the same manner as the second pixel 712.

According to the described above, the simulation 720 of reproducing the hologram image using the random pinhole panel 130 to which the mirror boundary condition is applied may generate an image due to a high-order term. In other words, when the size of the pinhole is increased by applying the mirror boundary condition, the viewing angle may be decreased. In addition to the mirror boundary condition, when a method to increase the size of the pinhole only within the pixel is used, as an image due to the high-order term may occur, the viewing angle may be decreased. The method of increasing the size of the pinhole only within the pixel may include a method of applying a cyclic boundary condition or an abrupt boundary condition.

Figure 8:
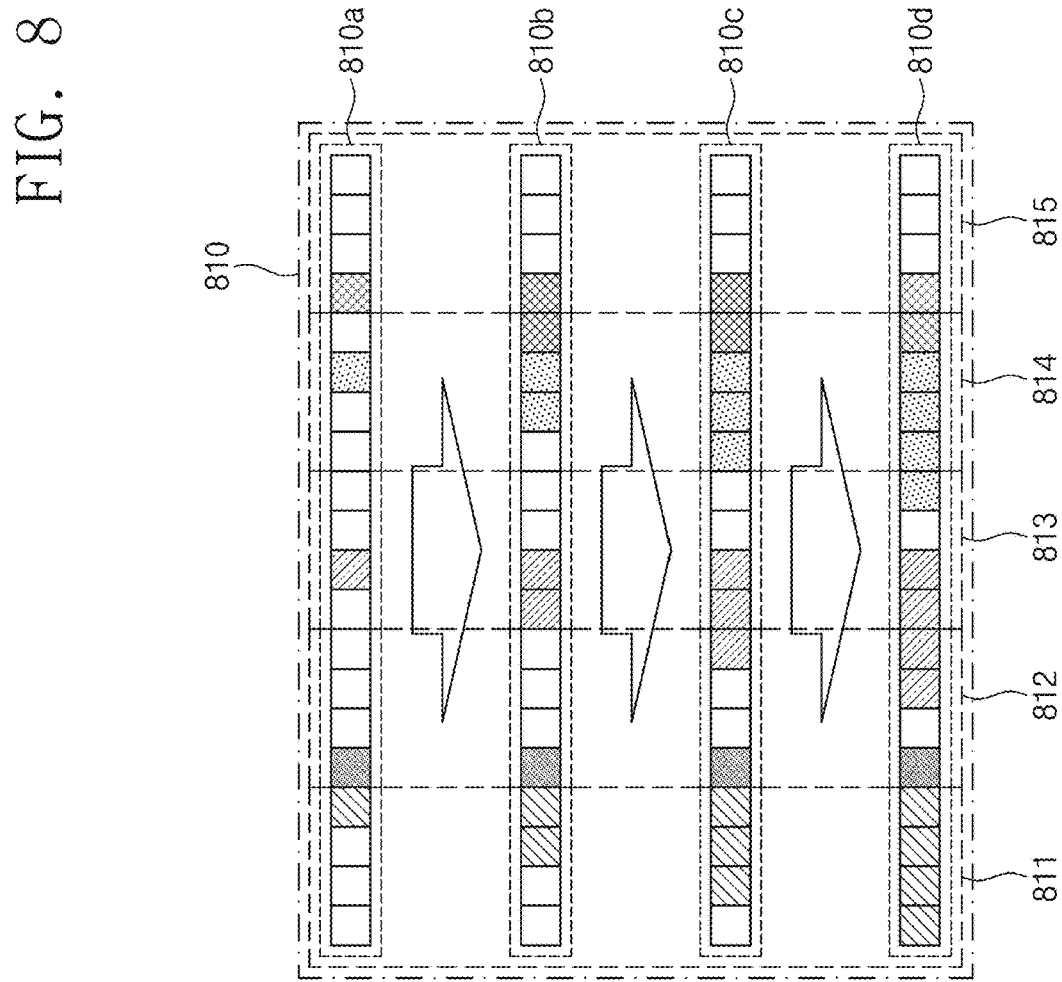
FIG. 8 is a diagram illustrating a method of applying a first condition (boundless_1_1) that is applied to a random pinhole panel and simulation results reproduced depending on application of the first condition.

FIG. 8 is a diagram illustrating a method of applying a first condition (boundless_1_1) that is applied to a random pinhole panel and simulation results reproduced depending on application of the first condition.

In pixels 811, 812, 813, 814, and 815 of the spatial light modulator 120 (refer to FIG. 1), a direction from the first pixel 811 to the fifth pixel 815 may be defined as a first direction.

In more detail, FIG. 8 represents a method 810 of applying the first condition among boundless conditions that are one of the methods of increasing the size of the pinhole on the random pinhole panel 130 (refer to FIG. 1), and a simulation result accordingly. When the boundless conditions are applied, unlike the mirror boundary conditions described above, the size of the pinhole may be expanded outside the pixels 811, 812, 813, 814, and 815 of the spatial light modulator 120 (refer to FIG. 1). When the first condition is applied, the size of the pinhole may increase in the direction opposite to the first direction of the pinhole. However, when the pinhole contacts the adjacent left pinhole, the size of the pinhole may not be expanded anymore.

In an embodiment of FIG. 8, the pixel pitch of the spatial light modulator 120 may be 8 μm×2 μm. Before the size of the pinhole increases, the size of the pinhole on the random pinhole panel 130 in an initial stage 810a may be 2 μm×2 μm. In an embodiment of FIG. 8, since the expansion of the pinhole is not limited to inside the pixels of the spatial light modulator 120, the size of the pinhole may exceed 8 μm×2 μm.

When the first condition is applied to the first pixel 811, the 2 μm×2 μm pinhole existing at the edge of the pixel in the initial stage 810*a* is expanded in the direction opposite to the first direction to become a 4 μm×2 μm pinhole in a second stage 810*b*. The 4 μm×2 μm pinhole in the second stage 810*b* may be expanded in the direction opposite to the first direction in a third stage 810*c* to become a 6 μm×2 μm pinhole. The 6 μm×2 μm pinhole in the third stage 810*c* may be expanded in the direction opposite to the first direction in a fourth stage 810*d* to become an 8 μm×2 μm pinhole.

When the first condition is applied to the second pixel 812, since the 2 μm×2 μm pinhole existing at the edge of the pixel in the initial stage 810*a* is in contact with the pinhole of the first pixel 811, the size may not be expanded in the direction opposite to the first direction. Accordingly, the pinhole that is located in the second pixel 812 in the initial stage 810*a* is not expanded in the second stage 810*b*, the third stage 810*c*, and the fourth stage 810*d* and maintains the size of 2 μm×2 μm.

When the first condition is applied to the third pixel 813, the 2 μm×2 μm pinhole in the initial stage 810*a* may be expanded in the direction opposite to the first direction to become a 4 μm×2 μm pinhole in the second stage 810*b*. The 4 μm×2 μm pinhole in the second stage 810*b* may be expanded in the direction opposite to the first direction in the third stage 810*c* to become a 6 μm×2 μm pinhole. The 6 μm×2 μm pinhole in the third stage 810*c* may be expanded in the direction opposite to the first direction in the fourth stage 810*d* to become an 8 μm×2 μm pinhole.

When the first condition is applied to the fourth pixel 814, the pinhole may be expanded in the same manner as the third pixel 813.

When the first condition is applied to the fifth pixel 815, the 2 μm×2 μm pinhole existing at the edge of the pixel in the initial stage 810*a* may be expanded in the direction opposite to the first direction to become a 4 μm×2 μm pinhole in the second stage 810*b*. Since the 4 μm×2 μm pinhole in the second stage 810*b* is in contact with a pinhole of the fourth pixel 814, the size may not be expanded in the direction opposite to the first direction. Therefore, the 4 μm×2 μm pinhole in the second stage 810*b* is not expanded in the third stage 810*c* and the fourth stage 810*d* and maintains the size of the pinhole 4 μm×2 μm.

When the random pinhole panel 130 to which the first condition is applied as described above is used, since the position of the pinhole and the distance between the adjacent pinholes may be random, the size of the pinhole may also appear randomly. In the simulation 820 of reproducing the hologram image by using the random pinhole panel 130 to which the first condition is applied, an image due to the high-order term may not occur. In other words, when the size of the pinhole is increased by applying the first condition, the viewing angle may be maintained as it is.

Figure 9:
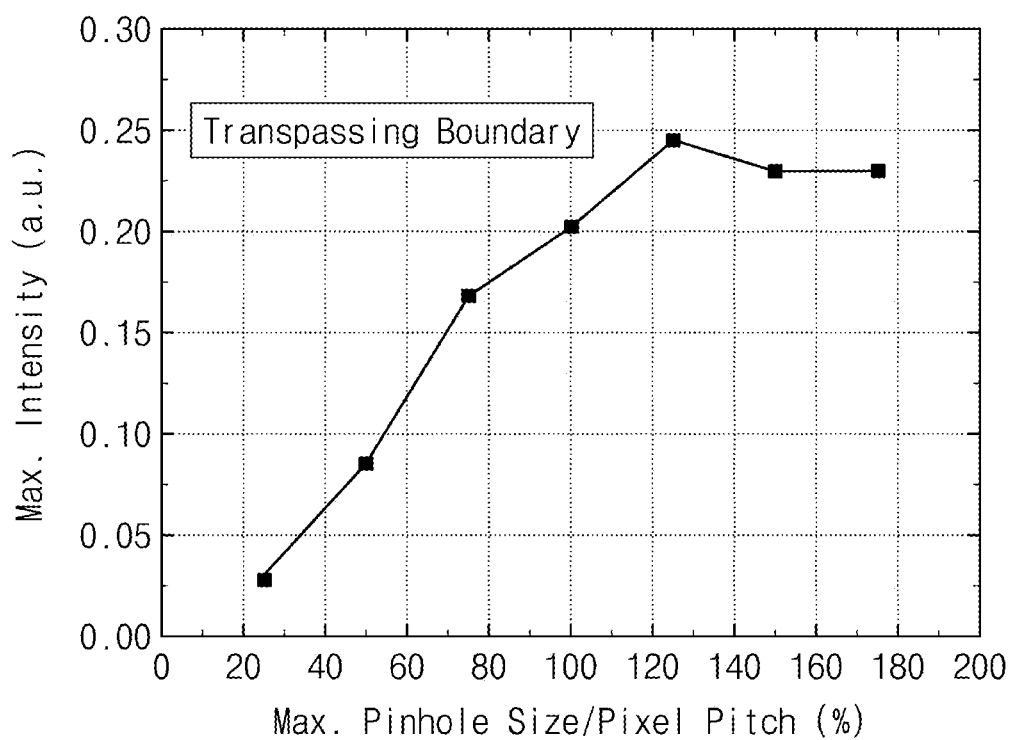
FIG. 9 is a graph illustrating a maximum brightness of a hologram that may be implemented when the first condition (boundless_1_1) is applied to a random pinhole panel.

FIG. 9 is a graph illustrating a maximum brightness of a hologram that may be implemented when the first condition is applied to a random pinhole panel.

Referring to FIG. 9, it may be understood that as the size of the pinhole/pixel pitch increases, a maximum value of the light intensity also increases. Since the size of the pixel pitch of the spatial light modulator 120 (refer to FIG. 1) is fixed, when the size of the pinhole increases, the maximum value of the light intensity increases. In other words, when the random pinhole panel 130 (refer to FIG. 1) to which the first condition is applied is used, since the size of the pinhole increases, the brightness of the reproduced hologram image may be brightened. Also, as described above, the random pinhole panel 130 to which the first condition is applied is used, the viewing angle may be maintained as it is. Therefore, the hologram image may be brightly implemented without loss of the viewing angle through the random pinhole panel 130 to which the first condition is applied.

Figure 10A:
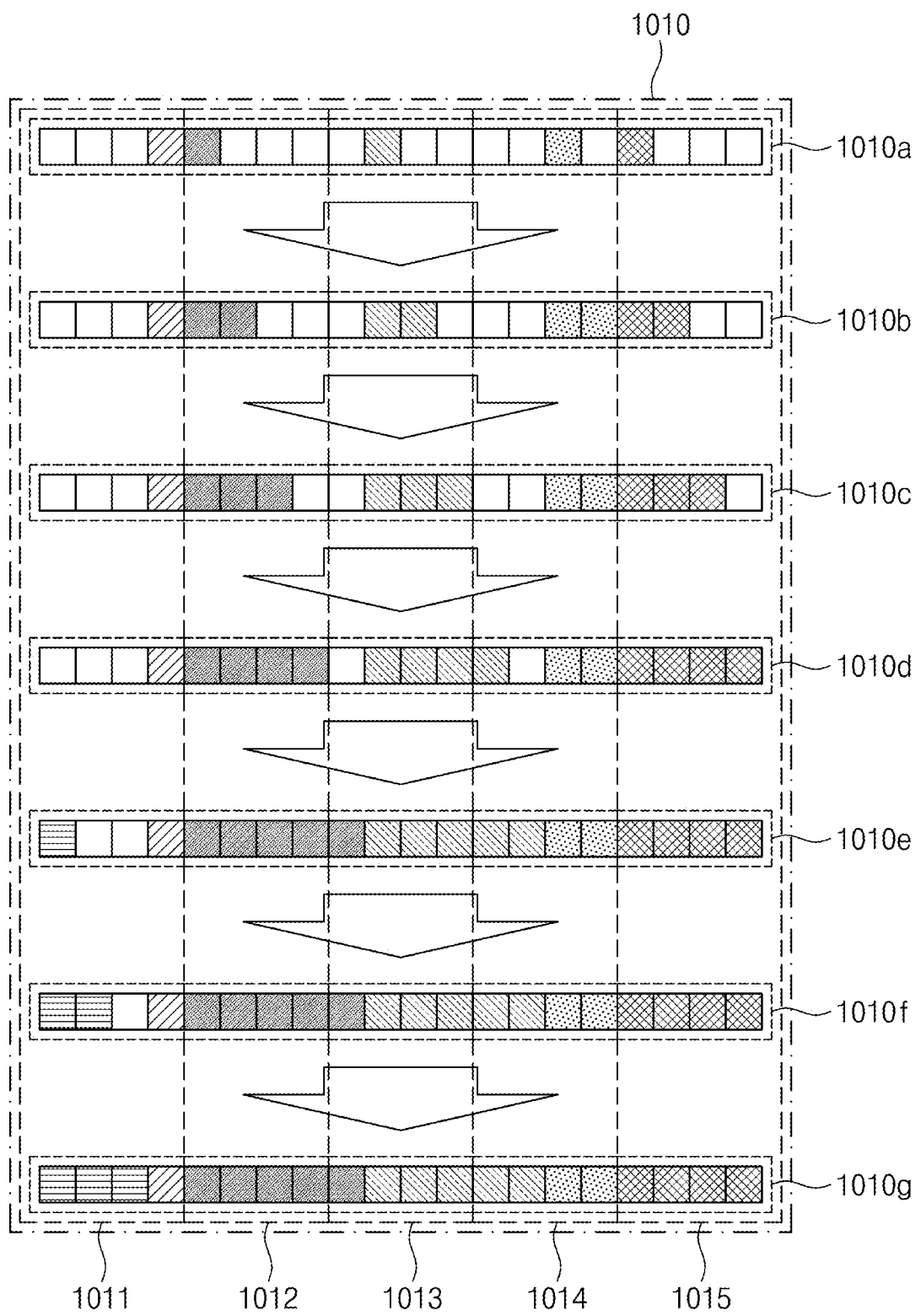
FIG. 10A is a diagram describing a principle in which a size of a pinhole is increased by applying a second condition (boundless_r_r), according to an embodiment of the inventive concept.

FIG. 10A is a diagram describing a principle in which a size of a pinhole is increased by applying a second condition (boundless_r_r), according to an embodiment of the inventive concept.

In pixels 1011, 1012, 1013, 1014, and 1015 of the spatial light modulator 120 (refer to FIG. 1), a direction from the first pixel 1011 to the fifth pixel 1015 may be defined as a first direction. Hereinafter, the same definition associated with the first direction may be applied to FIGS. 10B and 10C.

According to an application method 1010 of the second condition, through each of stages 1010*a*, 1010*b*, 1010*c*, 1010*d*, 1010*e*, 1010*f*, and 1010*g*, the size of the pinhole may be expanded outside pixels 1011, 1012, 1013, 1014, and 1015 of the spatial light modulator 120 (refer to FIG. 1). When the second condition is applied, the size of the pinhole may increase in the first direction of the pinhole. However, when the pinhole contacts an adjacent pinhole, the size of the pinhole may not be expanded anymore.

In an embodiment of FIG. 10A, the pixel pitch of the spatial light modulator 120 may be 8 μm×2 μm. Before the size of the pinhole increases, the size of the pinhole on the random pinhole panel 130 (refer to FIG. 1) in an initial stage 1010*a* may be 2 μm×2 μm. In an embodiment of FIG. 10A, since the expansion of the pinhole is not limited to inside the pixel of the spatial light modulator 120, the size of the pinhole may exceed 8 μm×2 μm.

Figure 10B:
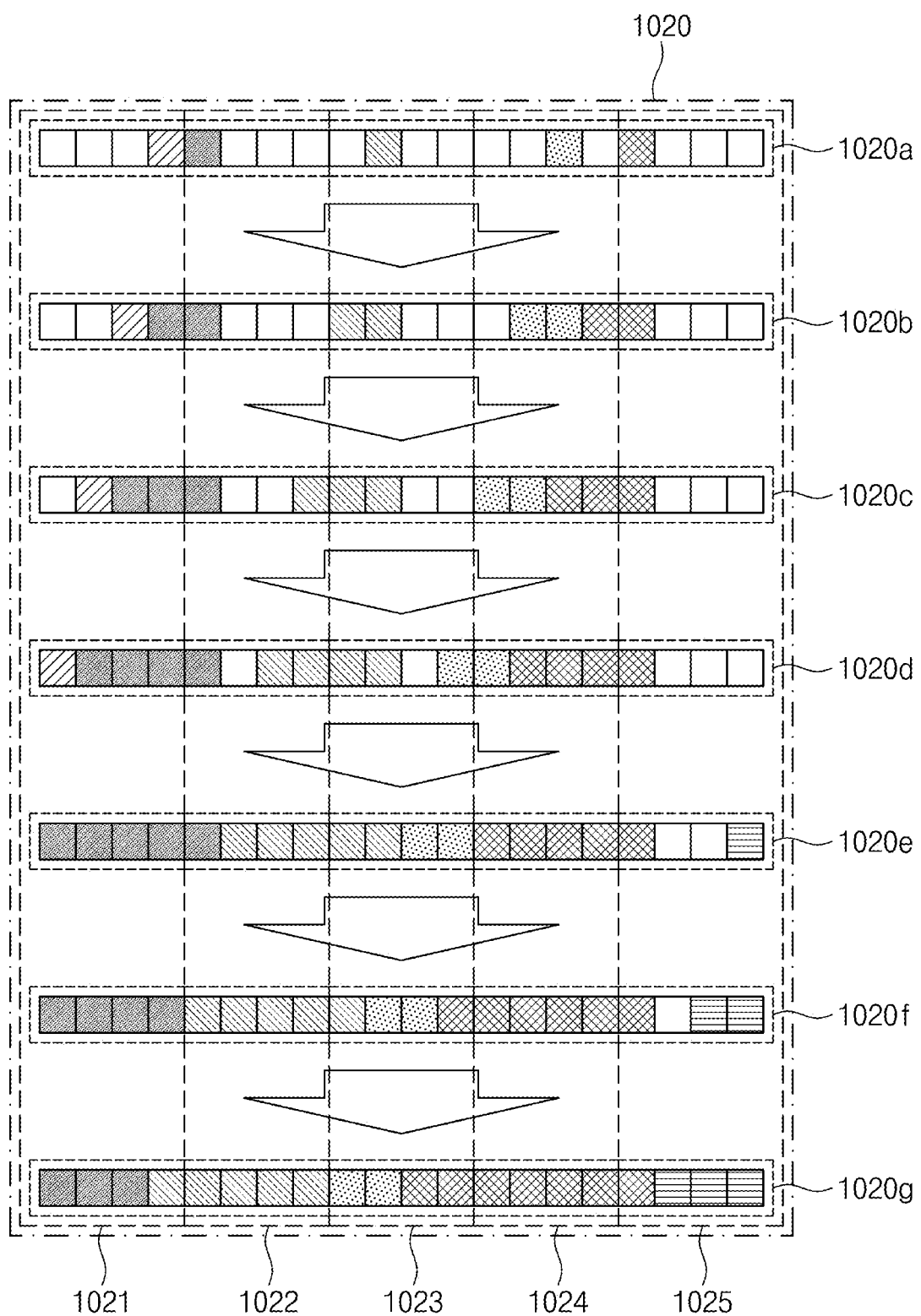
FIG. 10B is a diagram describing a principle in which a size of a pinhole is increased by applying a third condition (boundless_1_r), according to an embodiment of the inventive concept.

FIG. 10B is a diagram describing a principle in which a size of a pinhole is increased by applying a third condition (boundless_l_r), according to an embodiment of the inventive concept.

According to an application method 1020 of the third condition, through each of stages 1020*a*, 1020*b*, 1020*c*, 1020*d*, 1020*e*, 1020*f*, and 1020*g*, the size of the pinhole may be expanded outside the pixels 1021, 1022, 1023, 1024, and 1025 of the spatial light modulator 120 (refer to FIG. 1). When the third condition is applied, the size of the pinhole may increase in the direction opposite to the first direction of the pinhole. However, when the pinhole contacts an adjacent pinhole, the size of the pinhole may be expanded by invading the adjacent pinhole. In other words, the size expansion of the pinhole is made in the direction opposite to the first direction, but the size expansion of the pinhole in the direction opposite to the first direction may be prioritized.

In an embodiment of FIG. 10B, the pixel pitch of the spatial light modulator 120 may be 8 μm×2 μm. Before the size of the pinhole increases, the size of the pinhole on the random pinhole panel 130 (refer to FIG. 1) in an initial stage 1020*a*, may be 2 μm×2 μm. In an embodiment of FIG. 10B, since the expansion of the pinhole is not limited to the inside of the pixel of the spatial light modulator 120, the size of the pinhole may exceed 8 μm×2 μm.

Figure 10C:
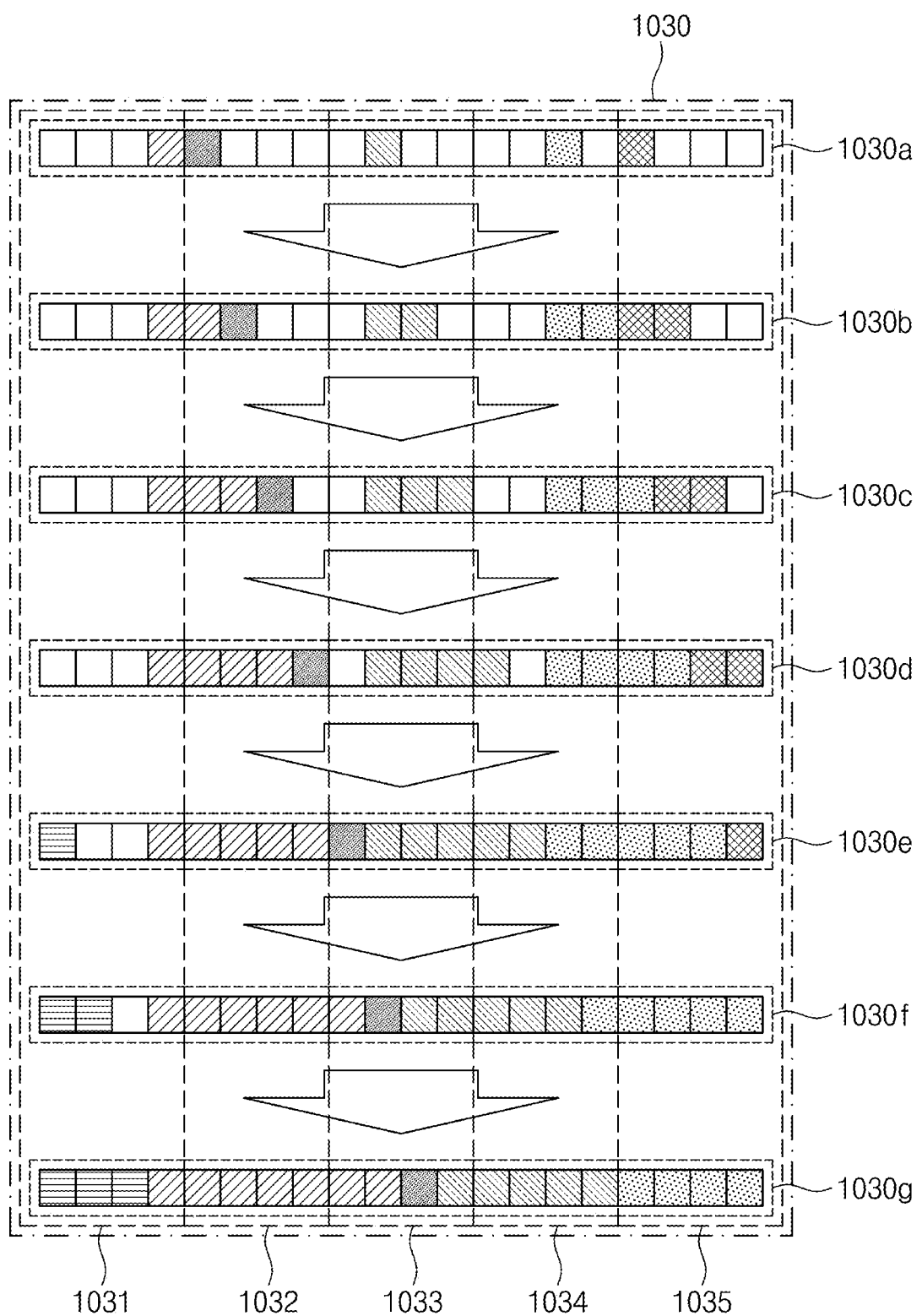
FIG. 10C is a diagram describing a principle in which a size of a pinhole is increased by applying a fourth condition (boundless_r_1), according to an embodiment of the inventive concept.

FIG. 10C is a diagram describing a principle in which a size of a pinhole is increased by applying a fourth condition (boundless_r_l), according to an embodiment of the inventive concept.

According to an application method 1030 of the fourth condition, through each of stages 1030*a*, 1030*b*, 1030*c*, 1030*d*, 1030*e*, 1030*f*, and 1030*g*, the size of the pinhole may be expanded outside the pixels 1031, 1032, 1033, 1034, and 1035 of the spatial light modulator 120 (refer to FIG. 1). When the fourth condition is applied, the size of the pinhole may increase in the first direction of the pinhole. However, when the pinhole contacts an adjacent pinhole, the size may be expanded by invading adjacent pinhole. In other words, the size expansion of the pinhole is made in the first direction, but the size expansion of the pinhole in the direction opposite to the first direction may be prioritized.

In an embodiment of FIG. 10C, the pixel pitch of the spatial light modulator 120 may be 8 μm×2 μm. Before the size of the pinhole increases, the size of the pinhole on the random pinhole panel 130 (refer to FIG. 1) in an initial stage 1030a may be 2 μm×2 μm. In an embodiment of FIG. 10C, since the expansion of the pinhole is not limited to the inside of the pixel of the spatial light modulator 120, the size of the pinhole may exceed 8 μm×2 μm.

Figure 11:
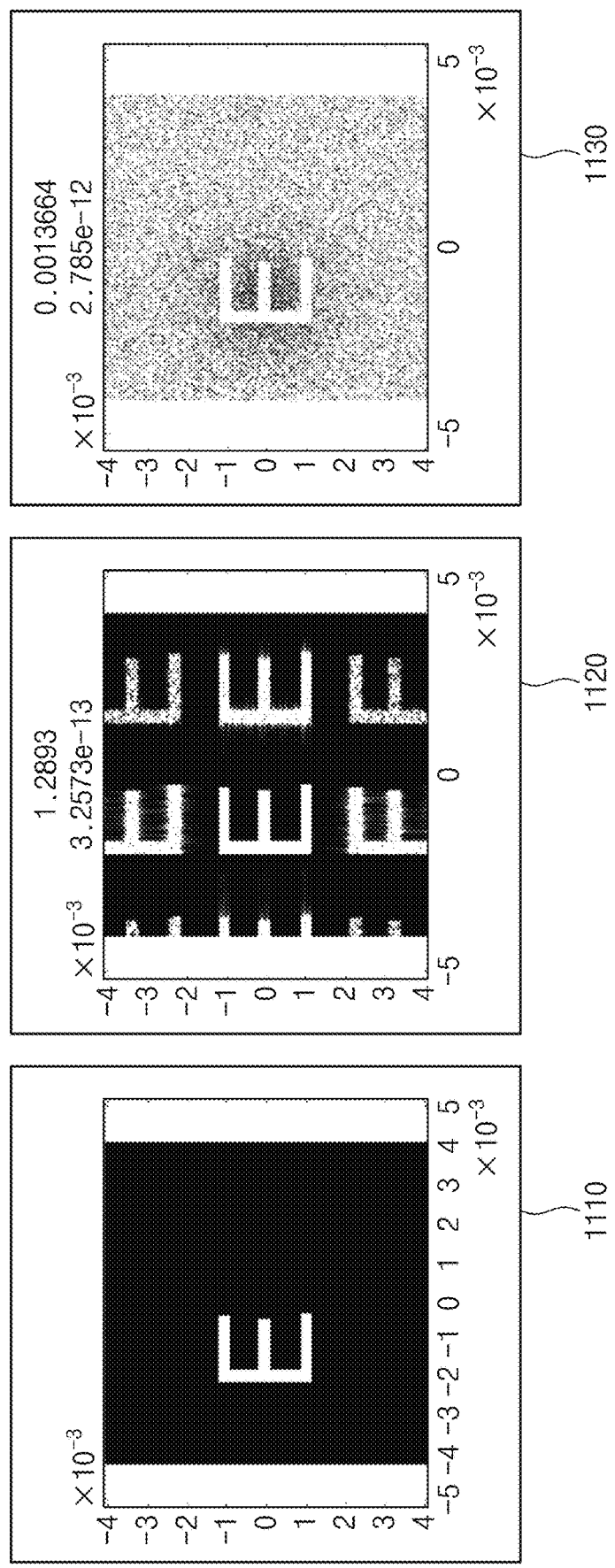
FIG. 11 is a diagram illustrating results of image simulations when a random pinhole panel in a two-dimensional direction is included and when a random pinhole panel in a two-dimensional direction is not included.

FIG. 11 is a diagram illustrating results of image simulations when a random pinhole panel in a two-dimensional direction is included and when a random pinhole panel in a two-dimensional direction is not included.

In more detail, FIG. 11 represents an original image 1110, an image simulation 1120 that is reproduced in a device including the spatial light modulator 120 (refer to FIG. 1), and an image simulation 1130 that is reproduced in a device including the spatial light modulator 120 and the random pinhole panel 130 (refer to FIG. 1). In the simulation, the spatial light modulator 120 having the pixel pitch of 8 μm×8 μm and the random pinhole panel 130 having the random pinhole of 2.67 μm×2.67 μm are applied.

Referring to FIG. 11, since the image simulation 1120 reproduced by the device including the spatial light modulator 120 has a relatively small viewing angle, an image by the high-order terms and the original image are mixed and implemented. On the other hand, in the image simulation 1130 reproduced by the device including the spatial light modulator 120 and the random pinhole panel 130, since the angle of the view is expanded, images due to the high-order terms are not implemented. However, due to the effect of the random pinhole, the noise increases and a darker holographic image is reproduced. Therefore, when a boundless condition is applied that allows the expansion of the pinhole to the outside of the pixel even in two dimensions, the above-mentioned problems may be solved.

Figure 12:
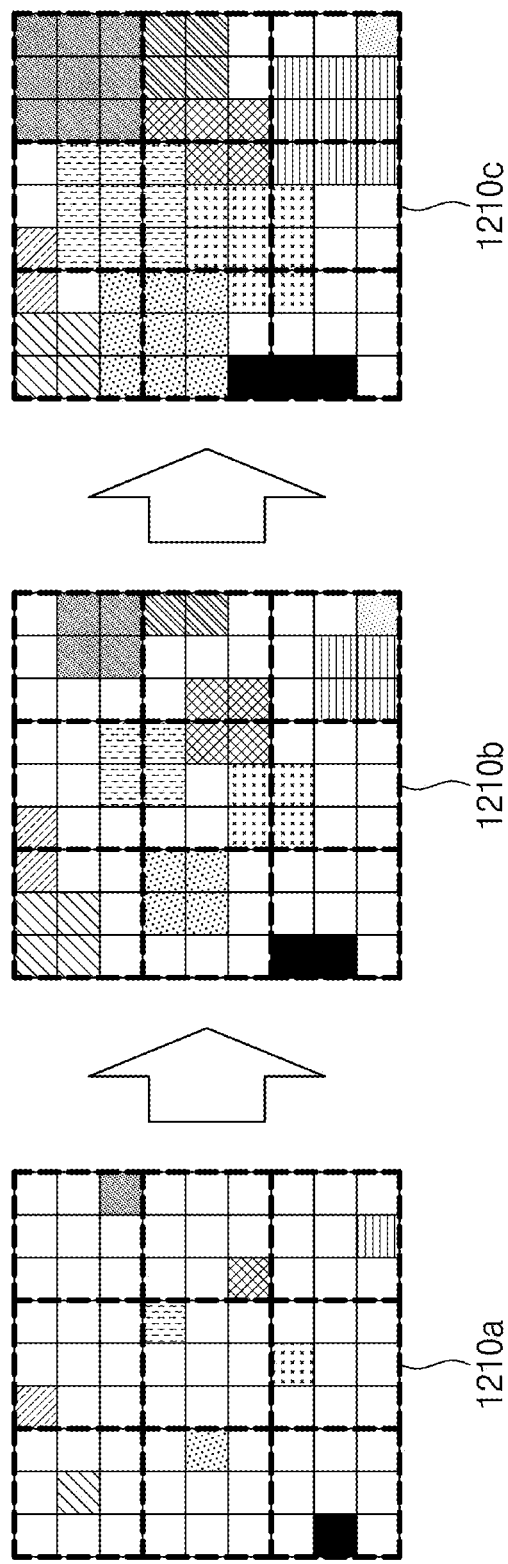
FIG. 12 is a diagram describing a principle in which a size of a pinhole is increased in two dimensions by applying a fifth condition (boundless_lu_lu), according to an embodiment of the inventive concept.

FIG. 12 is a diagram describing a principle in which a size of a pinhole is increased in two dimensions by applying a fifth condition (boundless_lu_lu), according to an embodiment of the inventive concept.

The first direction may be defined in the same direction as described in FIGS. 7, 8 and 10. When the first direction is referred to as an x-axis, a direction that becomes the direction of a y-axis may be defined as a second direction.

In more detail, FIG. 12 represents a method of applying the fifth condition, which is one of methods for increasing the size of the pinhole in two dimensions on the random pinhole panel 130 (refer to FIG. 1). When the fifth condition is applied, the size of the pinhole may be expanded to the outside of the pixel of the spatial light modulator 120 (refer to FIG. 1). When the fifth condition is applied, the size of the pinhole may increase in direction opposite to the first direction of the pinhole and in the second direction. However, when the pinhole contacts an adjacent pinhole, the size of the pinhole may not expanded in a corresponding direction anymore.

Figure 13:
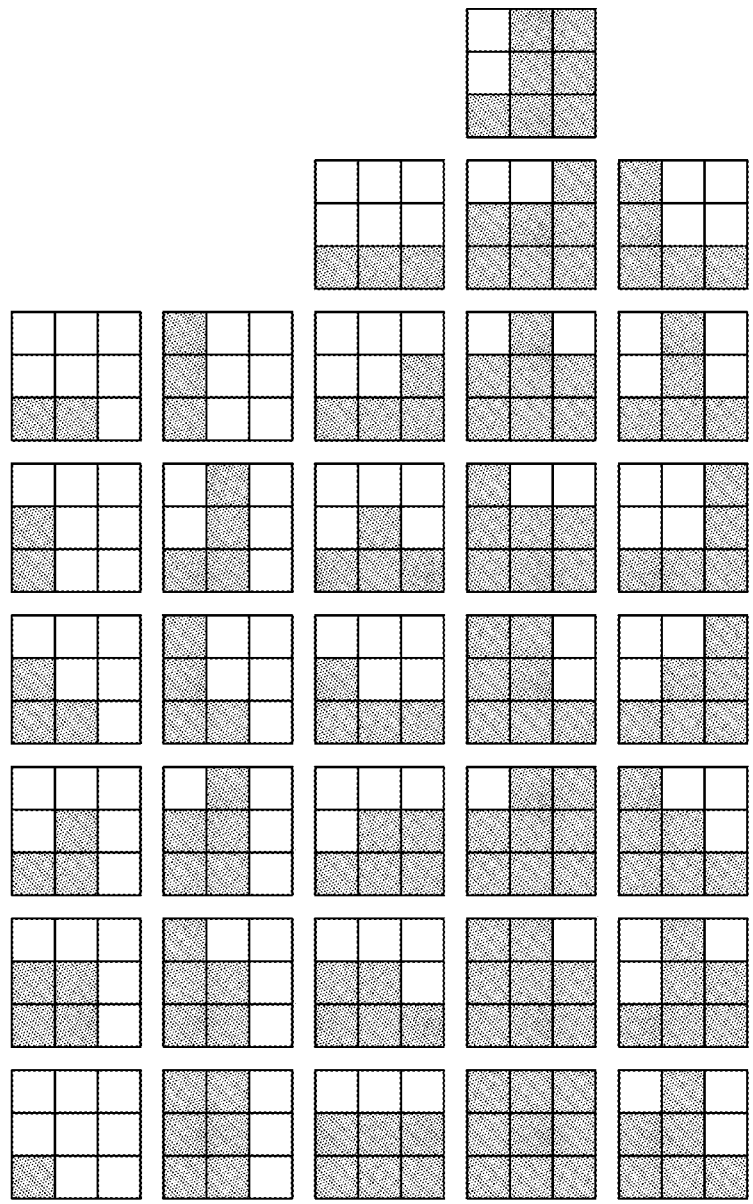
FIG. 13 is a diagram illustrating a pinhole shape that may be derived by applying the fifth condition (boundless_lu_lu) when a pixel size is 3×3 times a size of a pinhole.

FIG. 13 is a diagram illustrating a pinhole shape that may be derived by applying the fifth condition (boundless_lu_lu) when a pixel size is 3×3 times a size of a pinhole.

FIG. 13 represents 34 shapes of pinholes that may occur when the size of the pinhole is expanded by applying the fifth condition such that a maximum pinhole size is 8 μm×8 μm. For each pinhole, the size of the pinhole may vary depending on the distance between adjacent pinholes. In addition, since the distance between adjacent pinholes is random, the size of the pinhole may also appear randomly.

Figure 14:
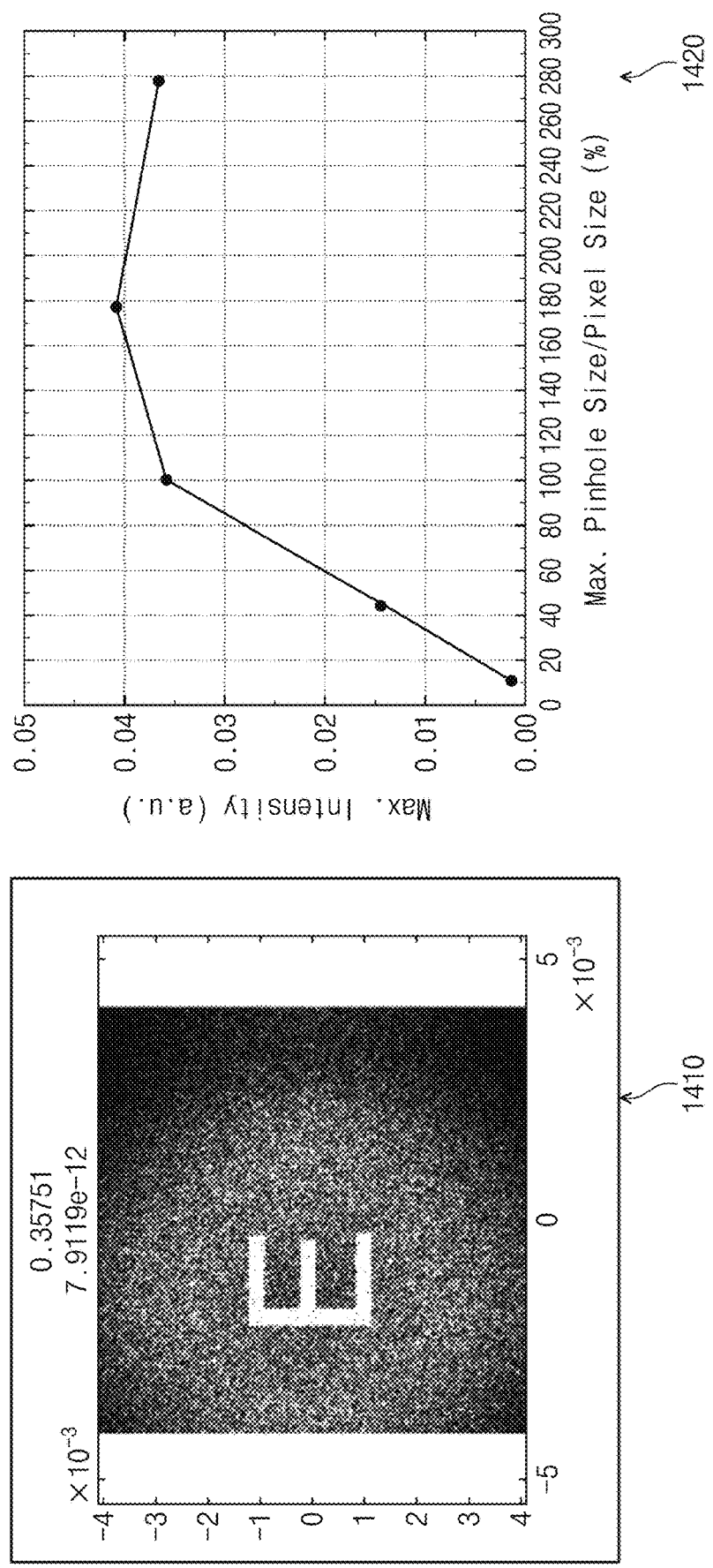
FIG. 14 is a graph illustrating a simulation result using a panel in which a size of a pinhole is increased in two dimensions by applying the fifth condition (boundless_lu_lu) and a maximum brightness of a hologram that may be implemented.

FIG. 14 is a graph illustrating a simulation result using a panel in which a size of a pinhole is increased in two dimensions by applying the fifth condition (boundless_lu_lu) and a maximum brightness of a hologram that may be implemented.

A simulation 1410 in which the hologram image is reproduced using the random pinhole panel 130 (refer to FIG. 1) to which the fifth condition is applied may not generate an image due to the high-order term. In other words, when the size of the pinhole is increased by applying the fifth condition, the viewing angle may be maintained as it is.

In addition, when the fifth condition is applied to the random pinhole panel 130, referring to a graph 1420 representing a maximum brightness of the hologram that may be implemented, it may be understood that as the size of the pinhole/the pixel pitch increases, the maximum value of the light intensity also increases. Since the size of the pixel pitch of the spatial light modulator 120 (refer to FIG. 1) is fixed, when the size of the pinhole increases, the maximum value of the light intensity increases. In other words, when the random pinhole panel 130 to which the fifth condition is applied is used, as the size of the pinhole increases, the brightness of the reproduced hologram image may be brightened. Therefore, the hologram image may be brightly implemented without loss of the viewing angle through the random pinhole panel 130 to which the fifth condition is applied.

Figure 15A:
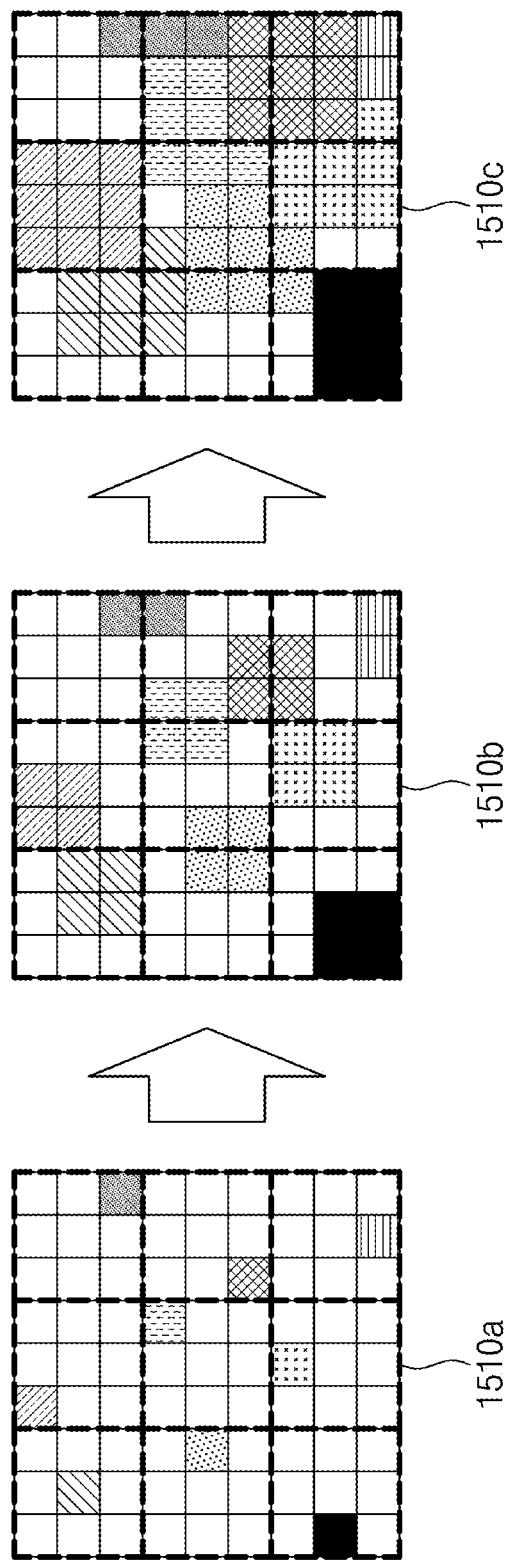
FIG. 15A is a diagram describing a principle in which a size of a pinhole is increased in two dimensions by applying a sixth condition (boundless_rd_rd), according to an embodiment of the inventive concept.

FIG. 15A is a diagram describing a principle in which a size of a pinhole is increased in two dimensions by applying a sixth condition (boundless_rd_rd), according to an embodiment of the inventive concept.

When the sixth condition is applied, through each of stages 1510a, 1510b, and 1510c, the size of the pinhole may be expanded outside the pixel of the spatial light modulator 120 (refer to FIG. 1). When the sixth condition is applied, the size of the pinhole may increase in the first direction and in the direction opposite to the second direction of the pinhole. However, when the pinhole contacts an adjacent pinhole, the size of the pinhole may not be expanded in a corresponding direction anymore. For example, the 2.67 μm×2.67 μm pinhole in the initial stage 1510a may be expanded to a maximum of 5.34 μm×5.34 μm pinhole in the second stage 1510b. In addition, the 5.34 μm×5.34 μm pinhole in the second stage 1510b may be expanded to the 8 μm×8 μm pinhole in the third stage 1510c. In the sixth condition, since the expansion of the pinhole is not limited to inside the pixel of the spatial light modulator 120, the size of the pinhole may exceed the pixel size of 8 μm×2 μm.

Figure 15B:
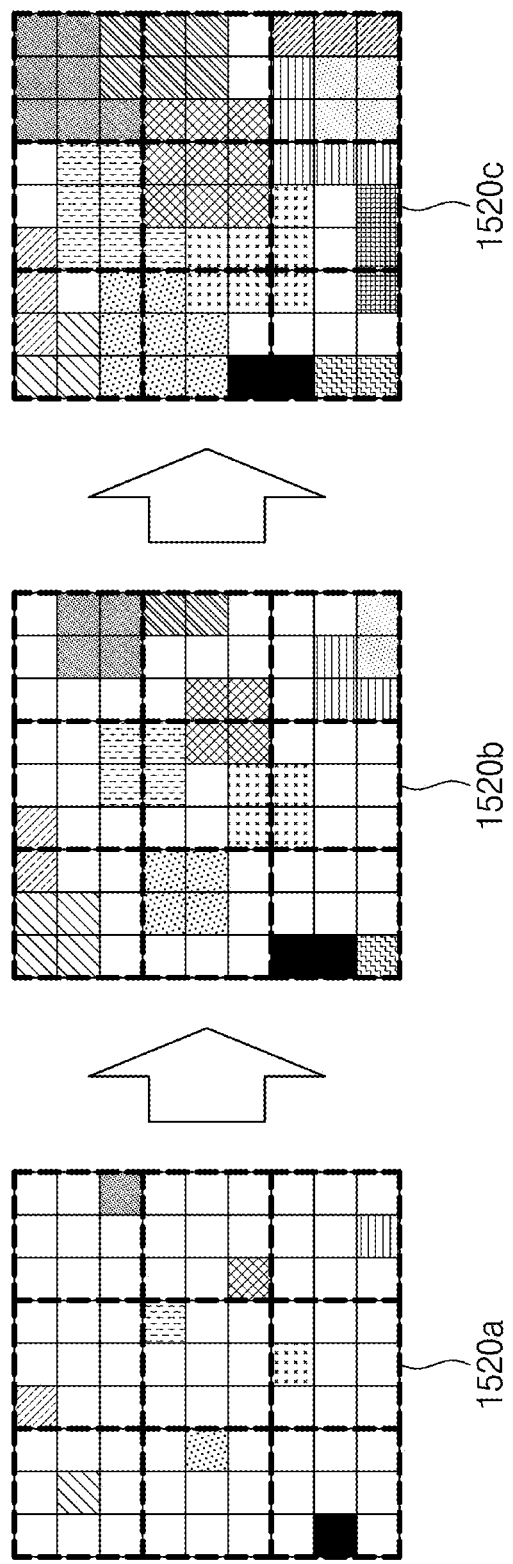
FIG. 15B is a diagram describing a principle in which a size of a pinhole is increased in two dimensions by applying a seventh condition (boundless_lu_rd), according to an embodiment of the inventive concept.

FIG. 15B is a diagram describing a principle in which a size of a pinhole is increased in two dimensions by applying a seventh condition (boundless_lu_rd), according to an embodiment of the inventive concept.

When the seventh condition is applied, through each of stages 1520a, 1520b, and 1520c, the size of the pinhole may be expanded outside the pixel of the spatial light modulator 120 (refer to FIG. 1). When the seventh condition is applied, the size of the pinhole may increase in the direction opposite to the first direction and in the second direction of the pinhole. However, when the pinhole contacts an adjacent pinhole, the size of the pinhole may be expanded by invading adjacent pinhole. In other words, the size expansion of the pinhole is made in the direction opposite to the first direction and in the second direction, but the expansion in the direction opposite to the first direction or the second direction may be prioritized.

Figure 15C:
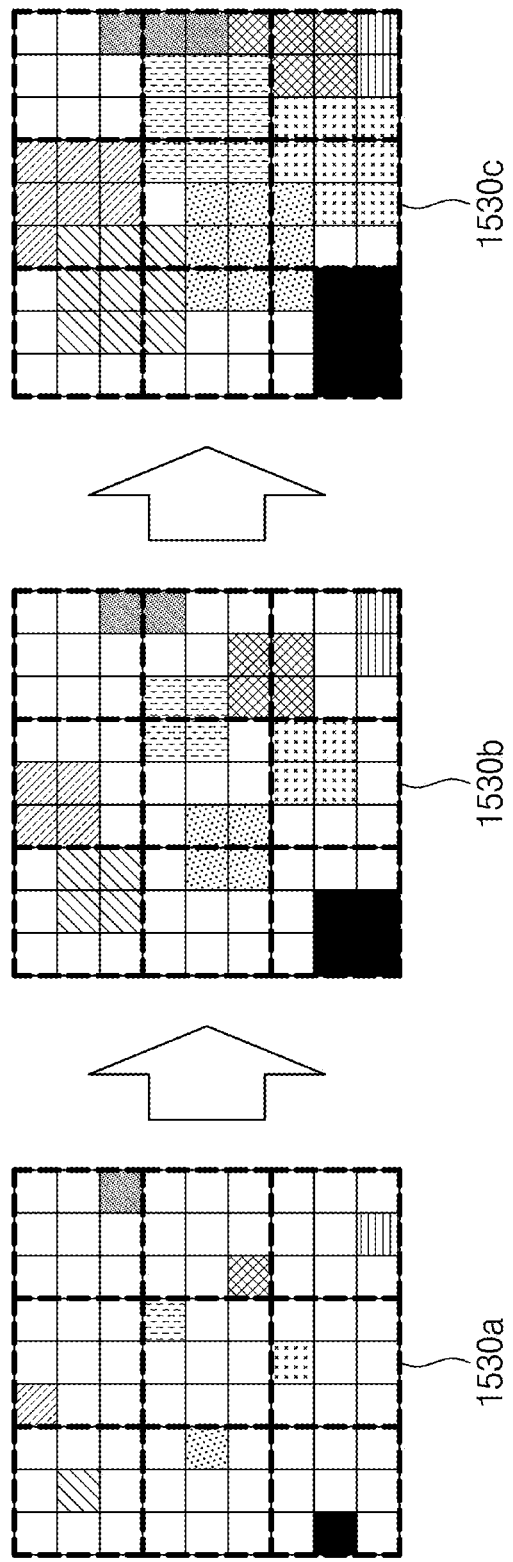
FIG. 15C is a diagram describing a principle in which a size of a pinhole is increased in two dimensions by applying an eighth condition (boundless_rd_lu), according to an embodiment of the inventive concept.

FIG. 15C is a diagram describing a principle in which a size of a pinhole is increased in two dimensions by applying an eighth condition (boundless_rd_lu), according to an embodiment of the inventive concept.

When the eighth condition is applied, through each of stages 1530a, 1530b, and 1530c, the size of the pinhole may be expanded outside the pixel of the spatial light modulator 120 (refer to FIG. 1). When the eighth condition is applied, the size of the pinhole may increase in the first direction and in the direction opposite to the second direction of the pinhole. However, when the pinhole contacts an adjacent pinhole, the size may be expanded by invading the adjacent pinhole. In other words, the size expansion of the pinhole is made in the first direction and in the direction opposite to the second direction, but the expansion in the first direction or in the direction opposite to the second direction may be prioritized.

Figure 16:
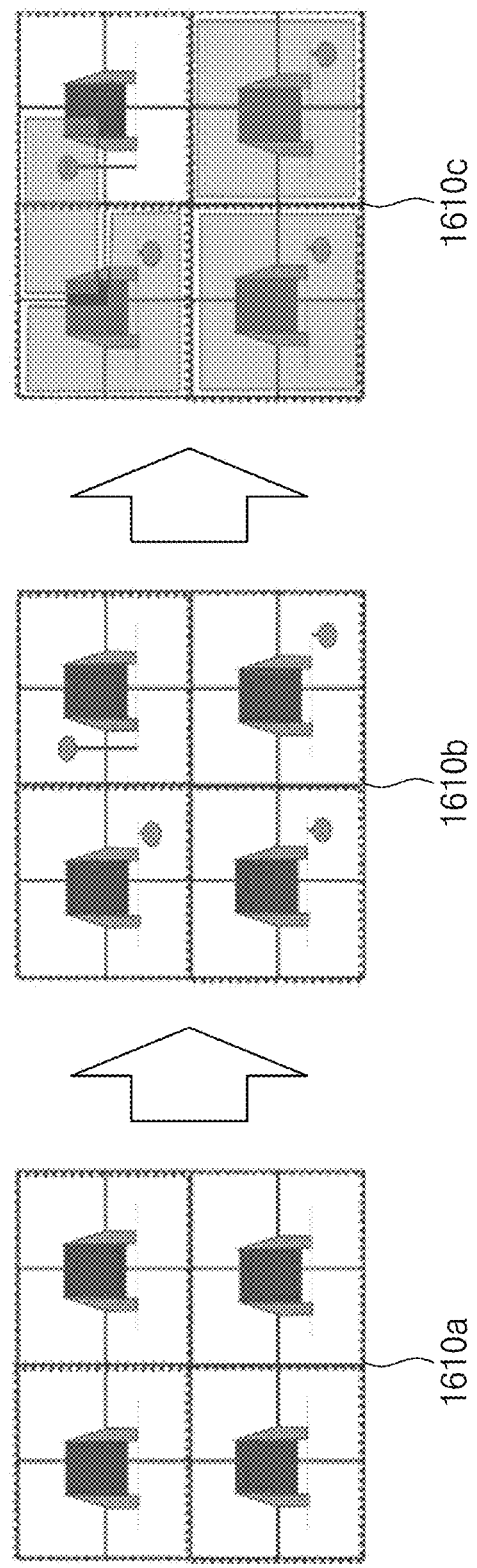
FIG. 16 is a diagram illustrating a process of fabricating a random pinhole panel in a process of manufacturing a spatial light modulator, according to an embodiment of the inventive concept.

FIG. 16 is a diagram illustrating a process of fabricating a random pinhole panel in a process of manufacturing a spatial light modulator, according to an embodiment of the inventive concept.

In step 1610a, one driving transistor may be manufactured for each pixel of the spatial light modulator 120 (refer to FIG. 1).

In step 1610b, a contact hole may be formed to connect the transistor and the random pinhole panel 130 (refer to FIG. 1) at the position of the random pinhole, and the transistor may be connected to the random pinhole panel 130 through the formed contact hole. In this case, since the position of the pinhole is random, a layer connecting the pinhole and the transistor may be separately manufactured as many as the number of random pinholes.

In step 1610c, a lower electrode of the random pinhole panel 130 may be formed by applying the boundless condition and by broadly disposing the pinhole or a reflector focusing on each contact hole. In this case, since the size and shape of the pinhole are determined by the distance between the pinhole and the peripheral pinhole, the lower electrode of various sizes and shapes may be formed.

According to the above-described steps, when a light-modulating material is deposited on the lower electrode to operate, the hologram image may be implemented brightly in addition to maintaining a wide viewing angle. The light modulating material may include a liquid crystal or a phase change material.

According to a hologram display device and a method of manufacturing thereof according to the inventive concept, the hologram image may be implemented without loss of viewing angle despite the increase in the size of the pinhole.

According to a hologram display device and a method of manufacturing thereof according to the inventive concept, a brightness of the hologram image may be realized brightly by increasing the size of a pinhole.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A hologram display device comprising:
    a light source unit configured to emit light;
    a spatial light modulator configured to modulate the light emitted from the light source unit; and
    a random pinhole panel configured to transmit the modulated light, and
    wherein the random pinhole panel includes a first pixel including a first pinhole and a second pixel adjacent to the first pixel in a first direction and including a second pinhole, and
    wherein a size of the first pinhole increases in the first direction.

2. The hologram display device of claim 1, wherein, when the first pinhole contacts the second pinhole of the second pixel due to the size increase of the first pinhole, the size of the first pinhole does not increase further in the first direction.

3. The hologram display device of claim 1, wherein, when the first pinhole contacts the second pinhole of the second pixel due to the size increase of the first pinhole, a position of the second pinhole in the second pixel is changed.

4. The hologram display device of claim 1, wherein a size of the second pinhole increases in a second direction opposite to the first direction.

5. The hologram display device of claim 4, wherein, when the first pinhole contacts the second pinhole due to the size increase of the first pinhole and the second pinhole, the size of the first pinhole does not increase further in the first direction and the size of the second pinhole does not increase further in the second direction.

6. The hologram display device of claim 1, wherein the random pinhole panel includes a third pixel,
    wherein the third pixel is adjacent to the first pixel in a second direction different from the first direction, and
    wherein the third pixel includes a third pinhole.

7. The hologram display device of claim 6, wherein the size of the first pinhole increases in the second direction.

8. The hologram display device of claim 7, wherein, when the first pinhole contacts the third pinhole due to the size increase of the first pinhole, the size of the first pinhole does not increase further in the second direction.

9. A method of manufacturing a hologram display device comprising a light source unit configured to emit light, a spatial light modulator configured to modulate the light emitted from the light source unit, and a random pinhole panel configured to transmit the modulated light, the method comprising:
    providing driving transistors to a plurality of pixels of the spatial light modulator, respectively;
    forming contact holes connecting the driving transistors and the random pinhole panel at positions of random pinholes in the random pinhole panel;
    connecting the contact holes to the driving transistors; and
    connecting the random pin holes to the contact holes, and
    wherein at least one of the random pinholes overlaps at least two of the plurality of pixels,
    wherein the random pinhole panel includes a first pixel including a first pinhole and a second pixel adjacent to the first pixel in a first direction and including a second pinhole, and
    wherein a size of the first pinhole increases in the first direction.

10. The method of claim 9, further comprising:
providing layers connecting the random pinholes to the driving transistors.

11. The method of claim 9, further comprising:
depositing a light modulating material on a bottom electrode.

* * * * *